United States Patent [19]

Chien

[11] Patent Number: 5,001,467
[45] Date of Patent: Mar. 19, 1991

[54] STRUCTURE OF OPTICAL MOUSE

[76] Inventor: Fong K. Chien, 5F, No. 3, Lane 359, Chung Shan Rd., Sec. 2, Chung Ho City, Taipei Hsien, Taiwan

[21] Appl. No.: 458,024

[22] Filed: Dec. 28, 1989

[51] Int. Cl.⁵ .......................... G09G 1/00; G09G 3/00
[52] U.S. Cl. ..................................... 340/710; 340/700
[58] Field of Search ............... 340/700, 706, 710, 709; 178/18; 33/1 M; 250/221; 273/148 B; 382/59; 364/708

[56] References Cited

U.S. PATENT DOCUMENTS

| | | | |
|---|---|---|---|
| 4,514,726 | 4/1985 | Whetstone et al. | 273/148 B |
| 4,635,496 | 1/1987 | McTyre | 273/148 B |
| 4,847,484 | 7/1989 | Kikuchi | 340/710 |
| 4,880,967 | 11/1989 | Kwang-Chien | 250/221 |
| 4,881,065 | 11/1989 | Soma et al. | 178/18 |
| 4,906,843 | 3/1990 | Jones et al. | 340/710 |
| 4,952,919 | 8/1990 | Nippoldt | 273/148 B |

Primary Examiner—Alvin E. Oberley
Assistant Examiner—M. Fatahiyar
Attorney, Agent, or Firm—Lowe, Price, LeBlanc, Becker & Shur

[57] ABSTRACT

An optical mouse for controlling the movement of a cursor on a visual display system, which includes a bottom shell having mounted thereon an electro-circuit assembly comprised of a LED and a main control system, a reflecting mirror, a lens, and an inductor, and being covered with an upper shell. The width or length of the receiving face of the mouse is relatively smaller than the length of its housing so that the mouse can be conveniently held and operated with the hand.

2 Claims, 3 Drawing Sheets

STRUCTURE OF OPTICAL MOUSE

BACKGROUND OF THE INVENTION

The present invention relates to an optical mouse and more particularly to the one which is for use with visual display system to control the movement of a cursor associated therewith.

A mouse is a hand-held device that is moved about on a flat surface in front of a video screen in such a way as to move or position the cursor on part of the display. In the existing pointing devices, the length or width of the receiving face of a mouse is larger than the height of such a mouse, i.e. the hand-held area is relatively smaller and not convenient for the holding and operation of the hand.

An object of the present invention is to provide an optical mouse, in which the length or width of its receiving face is smaller than the length of its housing so that it can be conveniently held and operated with the hand.

DETAILED DESCRIPTION OF THE PREFERRED EMBODIMENTS

Figure 1:
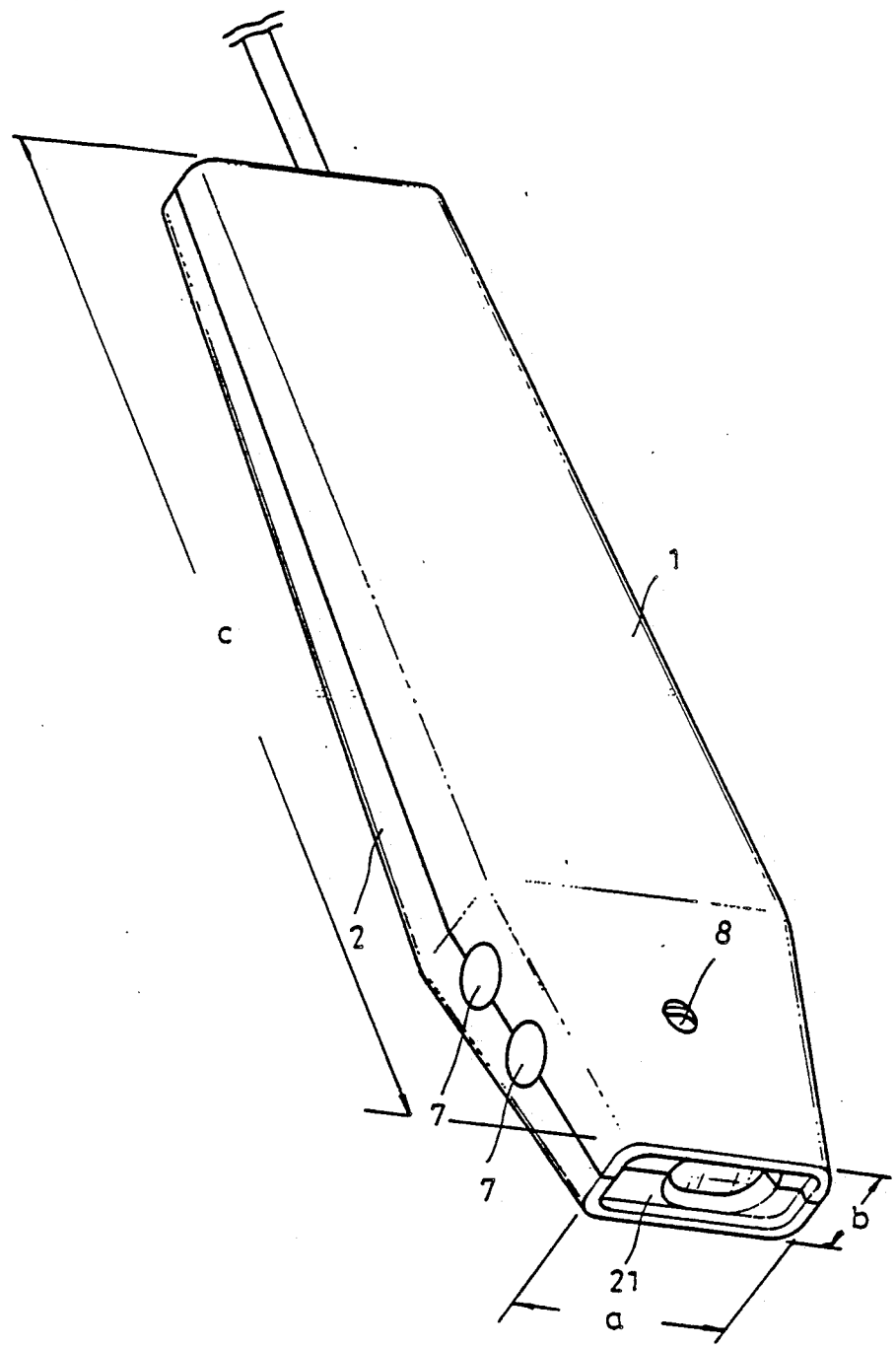
FIG. 1 is a perspective view of an optical mouse embodying the present invention.
Figure 2:
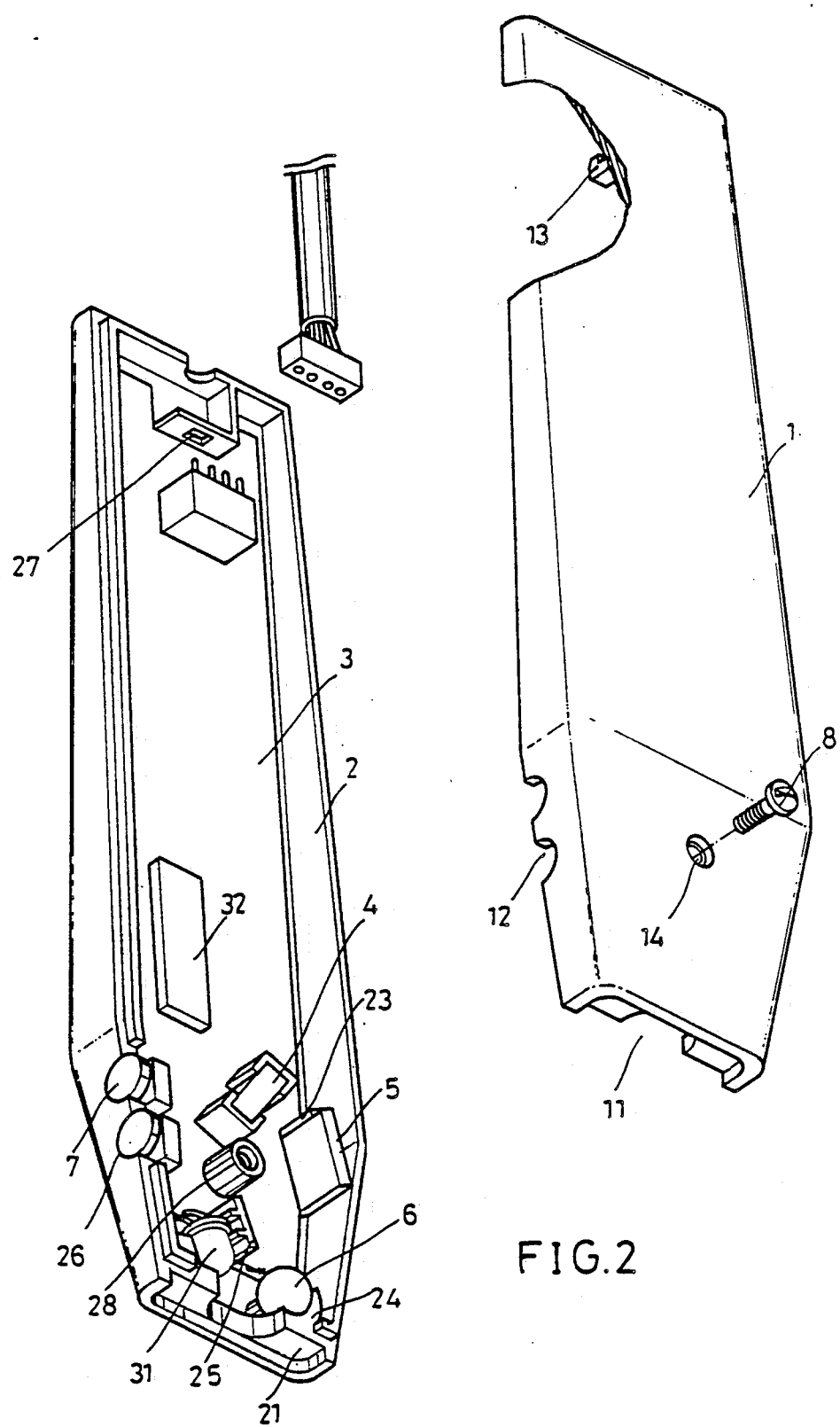
FIG. 2 is a fragmentary perspective view of the embodiment of FIG. 1.
Figure 3:
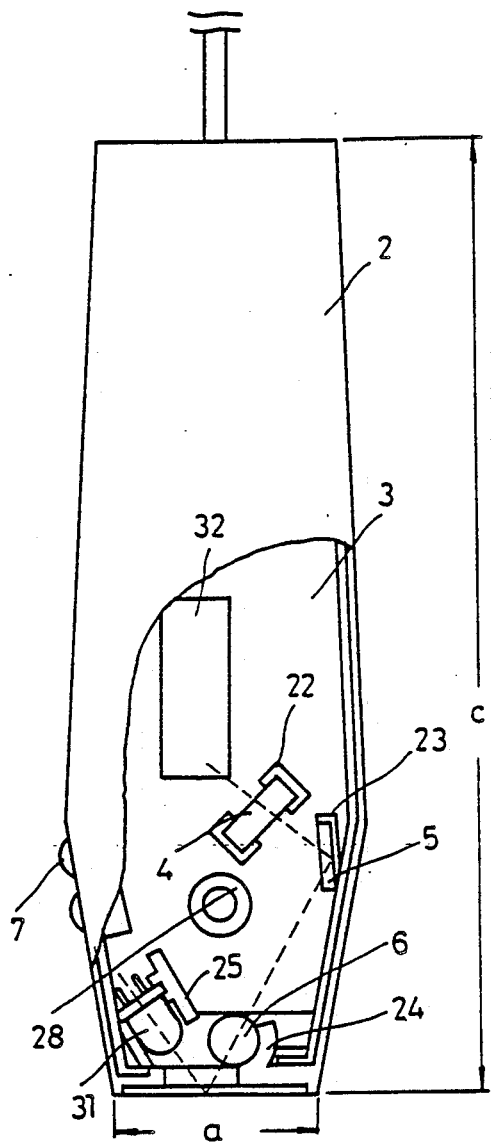
FIG. 3 is a plan and partly sectional view of the embodiment of FIG. 1.

Referring to the annexed drawings in greater detail, an optical mouse in accordance with the present invention is generally comprised of an upper shell (1), a bottom shell (2), and an electro-circuit assembly (3).

The upper shell (1) comprises a receiving face (11) at its one end, a plurality of semi-circular notches (12) on its side wall, a hook member (13) on its inner bottom surface, and a round hole (14) penetrating therethrough.

The bottom shell (2) comprises a receiving face (21), a first holder plate (22) eith an inductor (4) mounted thereon, a second holder plate (23) with a reflecting mirror (5) mounted thereon, a third holder plate (24) with a lens (6) mounted thereon, a fourth holder plate (25) with a LED (31) mounted thereon, which LED (31) is connected to teh electro-circuit assembly (3), a plurality of semi-circular notches (26) for the positioning therein of a plurality of function keys (7), a slot (27) at a position corresponding to the hook member (13) of the upper shell (1) for connection, a screw holder (28) at a position corresponding to the round hole (14) of the upper shell (1).

The electro-circuit assembly (3) is positioned in the bottom shell (2) and comprises a main control system (32) and the LED (31) which is mounted on the fourth holder plate (25) of the bottom shell (2).

During assembly, the upper shell (1) is mounted on the bottom shell (2) with its semi-circular notches (12) respectively matched with the semi-circular notches (26) of the bottom shell (3) to firmly retain the function keys (7), with its hook member (13) hooked up with the slot (27), and with its round hole (14) set in alignment with the screw holder (28) for the insertion therethrough of a screw (8) to secure the upper and bottom shells (1) and (2) together.

According to the foregoing statement, the upper shell (1), the bottom shell (2), the lens (6), the inductor (4), . . . all the component parts of the whole structure of the present optical mouse can be very conveniently assembled or dismounted for maintenance and replacement of parts.

The length (a) or width (b) of the receiving faces (11) and (21) of the upper and bottom shells (1) and (2) is much more smaller than the full length (c) of the shells (1) and (2), so that the whole optical mouse is convenient for the holding of the hand.

During operation, the LED (31) inside the receiving faces (11) and (21) emits lights to the reflecting mirror (5) in X and Y directions. Changes in contrast level indicate line crossings and transmitted to the inductor (4) for controlling the movement of a cursor associated with a visual display system.

I claim:

1. An optical mouse, including:

an upper shell comprising a receiving face, a plurality of semi-circular notches, a hook member, and a round hole penetrating therethrough;

a bottom shell comprising a receiving face, a first holder plate with an inductor mounted thereon, a second holder plate with a reflecting mirror mounted thereon, a third holder plate with a lens mounted thereon, a fourth holder plate with a LED mounted thereon, a plurality of semi-circular notches for the positioning therein of a plurality of function keys, a slot corresponding to said hook member, and a screw holder corresponding to said round hole; and an electro-circuit assembly positioned in said bottom shell and comprising a main control system connected to said LED;

wherein said upper shell is mounted on said bottom shell with its semi-circular notches respectively matched with the semi-circular notches of said bottom shell to firmly retain said function keys, with its hook member hooked up with said slot, and with its round hole set in alignment with said screw holder for the insertion therethrough of a screw to secure said upper and bottom shells together.

2. An optical mouse according to claim 1, wherein the length or width of the combination of the receiving faces of said upper and bottom shells is smaller than the length of the combination of said upper and bottom shells, so that the optical mouse is convenient for the holding and operation of the hand.

* * * * *